E. R. HUNNEWELL.
SPLIT RIM ATTACHMENT.
APPLICATION FILED FEB. 7, 1918.
1,417,171.
Patented May 23, 1922.
2 SHEETS—SHEET 1.
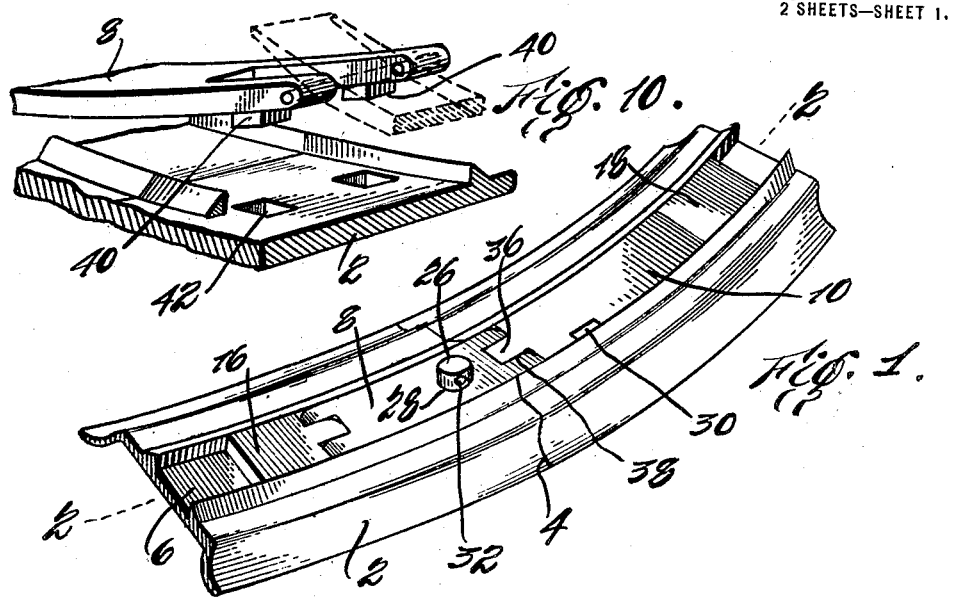
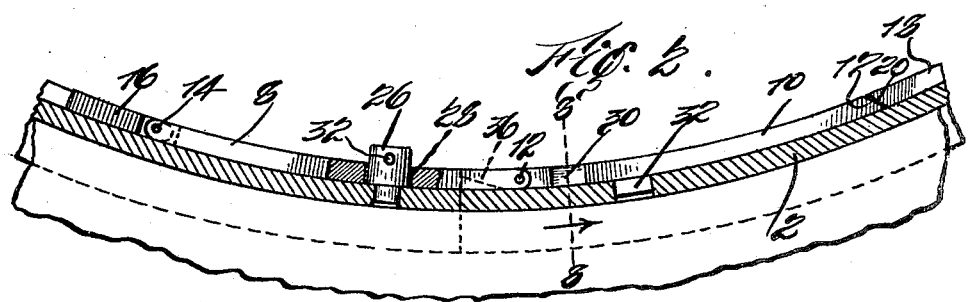
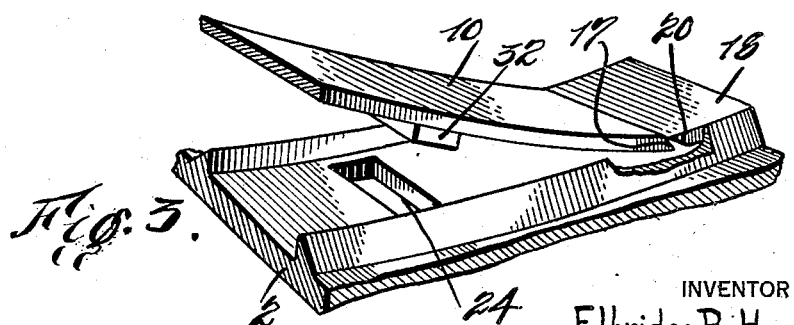
INVENTOR
Elbridge R. Hunnewell
BY
Newell & Neal
ATTORNEYS

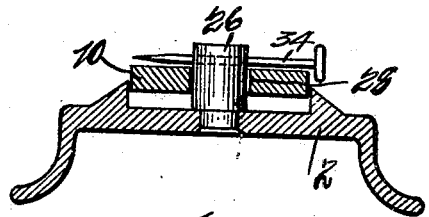
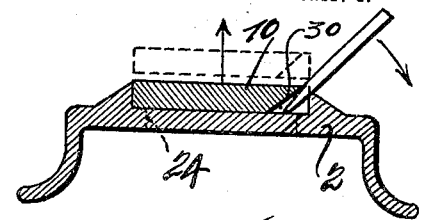
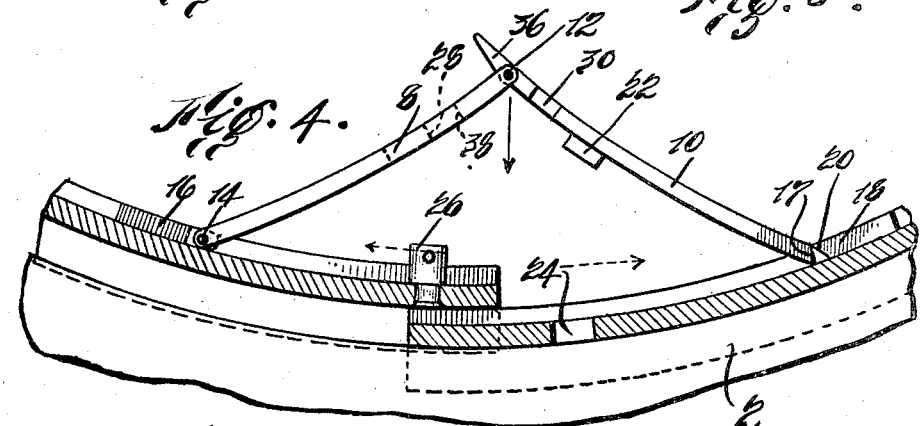
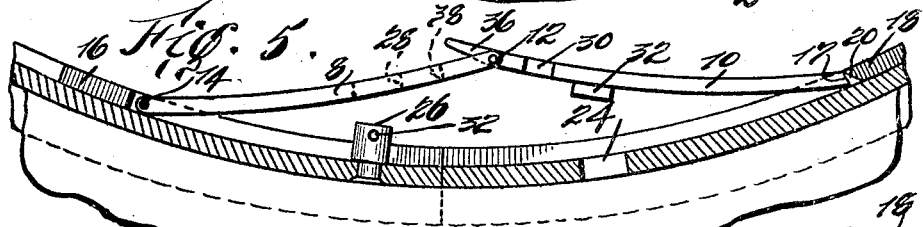
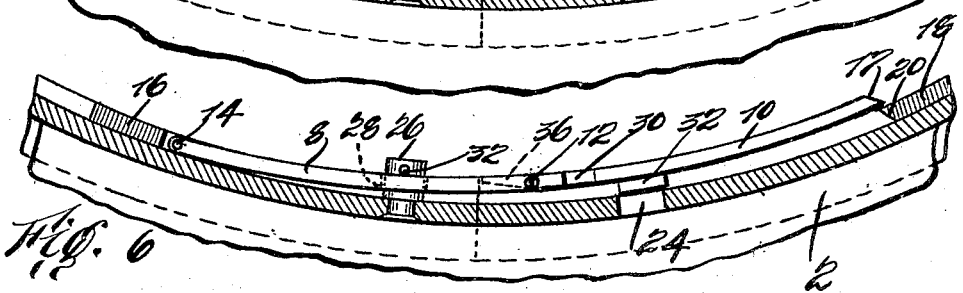
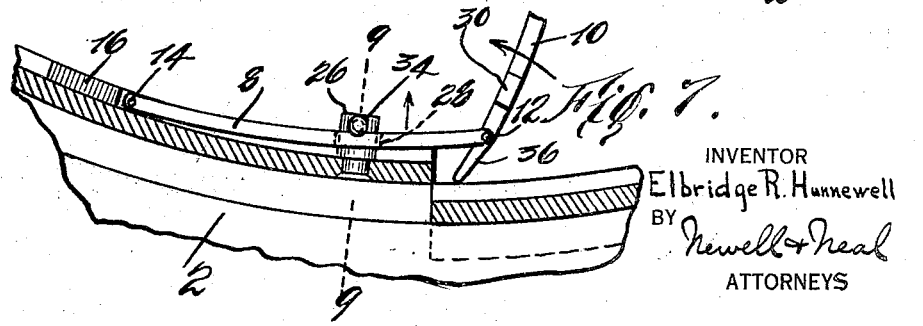

UNITED STATES PATENT OFFICE.

ELBRIDGE R. HUNNEWELL, OF NEW YORK, N. Y.

SPLIT-RIM ATTACHMENT.

1,417,171.   Specification of Letters Patent.   Patented May 23, 1922.

Application filed February 7, 1918. Serial No. 215,808.

*To all whom it may concern:*

Be it known that I, ELBRIDGE R. HUNNEWELL, a citizen of the United States, residing at New York city, N. Y., have invented certain new and useful Improvements in Split-Rim Attachments, of which the following is a clear, full, and exact description.

This invention relates to split rims and particularly to attachments for such rims by which they may readily be restored to normal circular condition when broken or contracted for the removal or replacement of a tire. The invention further relates to means by which the breaking or contracting of the split rim may readily be effected.

An object of the invention is to provide simple, compact and positive split-rim expanding or restoring means, which may be permanently connected to the rim in position for convenient use, and which, nevertheless, will neither interfere with the mounting of the rim upon the wheel nor with the manipulation of the rim when removing or replacing the tire.

A further object of the invention is to provide means of the class described, which may be manipulated to effect the breaking or contracting of the rim.

Other objects and important features of the invention will appear from the following description and claims when considered in connection with the accompanying drawings, in which—

Fig. 1 is a perspective view of a portion of a rim in its normal, circular condition, with the invention applied thereto;

Fig. 2 is a section on the line 2—2 of Fig. 1;

Fig. 3 is a perspective detail showing the bearing for the unattached end of the rim-expanding toggle and the manner in which said end engages said bearing;

Fig. 4 is a section similar to Fig. 2 but showing the rim contracted and the toggle in its free broken condition;

Fig. 5 is a view similar to Fig. 4 but showing the toggle about to move into its straightened condition, this view illustrating the fact that the rim joint will be slightly spread by the straightening of the toggle;

Fig. 6 is a view similar to Figs. 2, 4 and 5 but showing the toggle about to be used as rim-breaking means;

Fig. 7 illustrates the toggle in the act of breaking the rim;

Fig. 8 is a section on the line 8—8 of Fig. 2, showing the manner of disengaging the free end of the toggle to permit its use as rim-breaking means;

Fig. 9 is a section on the line 9—9 of Fig. 7; and

Fig. 10 is a perspective detail showing a modification of the means for locking the two sides of the rim together at the rim joint.

The invention is herein illustrated as embodied in a rim 2, having a joint at 4 and having a groove or channel 6 upon its inner face, but it will be understood that the invention is not restricted to the illustrated embodiment and that it is of equal utility with rims having different cross-sections.

The rim 2 has preferably only the one split or joint 4 and is preferably normally under such tension that when the two parts are moved transversely past each other at the joint 4, the rim will spring into the condition shown in Fig. 4 of the drawing. To effect the relative movement of the parts of the rim out of engagement with each other at the joint 4, and also to restore them to the position shown in Fig. 1 of the drawings, is the purpose of the mechanism which constitutes the subject-matter of the present invention, and in its illustrative embodiment this mechanism comprises a toggle constituted by toggle links 8 and 10 having the knee joint of the toggle at 12, the link 8 being pivotally connected at 14 to a bearing member 16 permanently connected to the rim, and the link 10 being unconnected to the rim.

The links 8 and 10 are longitudinally curved on curves concentric with the rim so that they will lie snugly against the inner face of the rim or against the bottom of the channel 6 in the rim. At its free end the link 10 is chamfered or beveled for a purpose hereinafter to be set forth, and this beveled end 17 is adapted to engage a thrust bearing formed upon a bearing member 18 when the toggle is straightened or when the rim is in broken condition, the toggle-engaging surface of the bearing member 18 being also chamfered or beveled, as shown at 20, the bevels 17 and 20 being so related to each other that the bearing member 18 overhangs the end of the link 10 when the toggle lies against the inner face of the rim. The bearing members 16 and 18 are so spaced apart that when the toggle is in its straightened condition, the rim joint will be slightly spread, thus facilitating the relative transverse movement of the parts of the rim on the two sides of the joint 4 into opposed relation to each other. It will be noted that the particular inclination of the bevel 17 upon the end of the link 10 is such that when the toggle is in its straightened condition or is broken towards the center of the rim, the face of the beveled end, having a transverse dimension greater than the thickness of the bearing 18, will engage the sharp edge of this bearing, and the expanding thrust of the toggle will thus be greater than would be the case if the end of the link 10 should engage under the overhanging part of the bearing 18 or if the link 10 were pivotally connected to the bearing 18. When, however, the toggle has moved past its straightened condition and is again broken toward the inner face of the rim, the beveled face 17 will rock under the beveled face 20 and the breaking of the toggle toward the rim will draw these two faces slightly apart, thus permitting the tension of the rim to hold the two parts tightly in engagement with each other at the joint 4.

In order further to insure the maintenance of the continuity of the rim at the joint 4, the rim and toggle are provided with interlocking parts upon opposite sides of the joint 4, whereby both longitudinal and lateral relative movements of the two parts of the rim are prevented. The interlocking parts, shown in the form of the invention illustrated in Figures 1 to 9 inclusive, comprise a rectangular lug 22 upon the link 10, adapted to fit into a correspondingly shaped opening 24 in the rim, and a cylindrical stud 26 upon the rim adapted to fit into a correspondingly shaped opening 28 in the toggle link 8. The stud 26 also serves as a guide for the toggle movement of the toggle, thus insuring, in connection with the sides of the groove 6, against lateral relative movement of the two parts of the rim, in case of lateral distortion, when the toggle is operating to restore the rim to its normal condition.

As hereinabove suggested, the rim-straightening toggle is preferably so constructed that it may be utilized in a different way to effect the breaking of the rim when it is desired to remove a tire. This use of the illustrated mechanism and the features of its construction, which permit its utilization to this end, are illustrated particularly in Figures 6, 7 and 8 of the drawings. When the toggle is in the position shown in Fig. 2 of the drawings, it is in broken condition, that is, it has moved past its straightened condition toward the rim. In order to move it away from the inner face of the rim and thus bring the interlocking parts of the toggle and rim out of engagement with each other, a tool-receiving notch 30 has been provided under one edge of the toggle link 10, into which a tool may be inserted, as shown in Fig. 8 of the drawings, to effect a prying of the toggle away from the rim, this notch being located near the knee joint 12 of the toggle. This movement of the toggle will effect its straightening and a slight spreading of the rim at the joint. If this movement is continued until the toggle is broken toward the center of the rim, the end 17 of the link 10 may then be withdrawn from engagement with the bearing 18 and the toggle may then be moved into the position shown in Fig. 6, with the link 8 again in interlocking relation to the stud 26. The stud 26 is shown, as provided, with a transverse opening 32, which is located above the link 8 or toward the center of the rim with respect to said link, when the link is brought against the inner face of the rim, or into the position shown in Fig. 6, and by inserting a pin or key 34 through this opening, the link 8 may be locked against movement about its pivot 14.

It will be noted that the link 8 bridges the joint 4 of the rim and that the knee joint 12 of the toggle is offset to the side of said rim joint remote from the pivot 14 of the link 8. The link 10 is extended beyond the knee joint 12, as shown at 36, this extension 36 being received in a fork 38 in the link 8 and stopping short of the joint 4 of the rim. When, therefore, the parts are in the position shown in Fig. 6 of the drawing, and the pin 34 has been inserted through the hole 32 in the stud 26, movement of the end 17 of the link 10 away from the inner face of the rim will cause the extension 36 of the link 10 to engage the inner face of the rim at one side of the joint and thus effect a relative movement of the two parts of the rim past each other, as shown in Fig. 7 of the drawings, thereby causing the rim to be broken or contracted into the condition shown in Fig. 4.

In Fig. 10 of the drawings is shown a slight modification of the interlocking construction, the link 8 being provided upon its two fork members, in proximity to the joint 4, with rectangular lugs 40 adapted to be received in correspondingly shaped openings 42 in the rim.

As hereinabove suggested, the co-operating bearing surfaces of the link 10 and the bearing member 18 are preferably so shaped as to increase somewhat the expanding thrust of the toggle, and are preferably so shaped that the maximum joint spreading thrust is imparted to the two parts of the rim before the toggle reaches its straightened condition, thus permitting more time for the rim parts to move into opposed relation before the toggle breaks against the inner face of the rim. This is a valuable feature of the invention, particularly when the invention is embodied in a rim of the type herein shown, in which the rim is tensioned to move into contracted condition and has the abutting ends so shaped that the rim tension tends to hold the rim parts in opposed relation at the joint.

Another novel feature of the invention, which is of great practical value in facilitating the breaking of the rim, is the mounting of the toggle upon the rim with only one link connected with its associated thrust bearing. With this construction, when the toggle is broken toward the center of the rim, there is no resistance from the toggle to the transverse movement of the rim parts essential to breaking or contracting the rim. With the distortion to which rims are subjected in use, the direction in which the rim tends to break varies from time to time and it is, therefore, important that there be no connection between the expanding means and the rim at the time the rim is broken which will either resist the easy breaking of the rim or will tend to distort or injure the expanding means.

What I claim as new is—

1. The combination with a one piece split rim normally under a tension tending to move it to contracted condition when broken at its joint and having ends shaped to be held by said tension in abutting relation when the rim is in normal condition, of means for moving said ends into abutting relation when the rim is broken, comprising a toggle, thrust bearings for the ends of said toggle upon opposite sides of the rim joint spaced on said rim to spread said joint when said toggle is straightened, said toggle being shaped to lie against the inner face of said rim when said rim is in normal condition, and being of such length that it is disengaged from at least one of its thrust bearings when in this position.

2. The combination with a one piece split rim having abutting ends shaped to maintain the joint when the rim is in normal expanded condition, the rim tension produced by such expansion tending to move said ends past each other when out of abutting relation, of rim expanding means, comprising a toggle, means for locking the toggle against toggle movement, and means carried by one of the toggle links and operable by the independent movement thereof for effecting a relative radial movement of the rim parts at the rim joint when the toggle is thus locked.

3. The combination with a one piece split rim having abutting ends shaped to maintain the joint when the rim is in normal expanded condition, the rim tension produced by such expansion tending to move said ends past each other when out of abutting relation, of a toggle bridging the rim joint and adapted to lie against the inner face of the rim when the rim is in its normal condition, the knee joint of said toggle being offset along the rim with respect to the rim joint, means for locking one of said toggle members against the inner face of the rim and an extension on the other member acting when the first-mentioned member is locked to effect the breaking of the rim joint.

4. The combination with a one piece split rim having abutting ends shaped to maintain the joint when the rim is in normal expanded condition, the rim tension produced by such expansion tending to move said ends past each other when out of abutting relation, of means for expanding said rim when in broken condition, comprising a toggle bridging the rim joint and pivotally attached at one end to said rim, means for locking the attached toggle member against toggle movement, and means on the other toggle member for breaking said rim joint when said first-mentioned toggle member is locked.

Signed at New York city, N. Y., this 6th day of February, 1918.

ELBRIDGE R. HUNNEWELL.